United States Patent
Burchard et al.

(10) Patent No.: US 8,605,875 B2
(45) Date of Patent: Dec. 10, 2013

(54) DYNAMIC CALL MANAGEMENT AND DISPLAY

(75) Inventors: Joshua D. Burchard, Somerville, MA (US); Jenny S. Li, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/034,001

(22) Filed: Feb. 24, 2011

(65) Prior Publication Data
US 2012/0219132 A1  Aug. 30, 2012

(51) Int. Cl.
*H04M 1/56* (2006.01)

(52) U.S. Cl.
USPC ............. 379/142.04; 379/142.1; 379/142.06; 379/201.02

(58) Field of Classification Search
USPC .................. 379/142.04, 201.02, 377, 207.02, 379/265.11, 265.12, 211.02, 142.1, 142.06, 379/207.03, 207.14, 207.15, 266.02
See application file for complete search history.

(56) References Cited

U.S. PATENT DOCUMENTS

| | | | |
|---|---|---|---|
| 4,924,496 A | 5/1990 | Figa et al. | |
| 5,388,150 A | 2/1995 | Schneyer et al. | |
| 7,257,210 B1 | 8/2007 | Henderson | |
| 7,274,781 B2 | 9/2007 | Lipton et al. | |
| 7,280,530 B2 * | 10/2007 | Chang et al. | 370/352 |
| 7,280,647 B2 | 10/2007 | Henderson | |
| 7,426,264 B1 | 9/2008 | Henderson | |
| 7,561,676 B2 | 7/2009 | Fernandes et al. | |
| 7,564,960 B2 | 7/2009 | Urban et al. | |
| 2003/0112945 A1* | 6/2003 | Brown et al. | 379/201.01 |
| 2004/0208301 A1* | 10/2004 | Urban et al. | 379/142.17 |
| 2005/0169446 A1* | 8/2005 | Randall et al. | 379/93.23 |
| 2006/0148459 A1 | 7/2006 | Wolfman et al. | |
| 2007/0190956 A1 | 8/2007 | Chen et al. | |
| 2009/0019144 A1 | 1/2009 | Barry et al. | |
| 2009/0186629 A1 | 7/2009 | Soelberg et al. | |

\* cited by examiner

*Primary Examiner* — Duc Nguyen
*Assistant Examiner* — Yosef K Laekemariam
(74) *Attorney, Agent, or Firm* — Cantor Colburn LLP; William A. Kinnaman, Jr.

(57) ABSTRACT

An embodiment includes one or more call systems and a computer processor communicatively coupled with the one or more call systems. The computer processor is configured to receive a communication from a first call system of the one or more call systems. The computer processor is further configured to retrieve recipient data from a second call system of the one or more call systems. The recipient data includes one or more receiver conditions. The computer is additionally configured to determine if the one or more receiver conditions have been met, and if they have been met, the computer processor forwards the communication to the second call system.

22 Claims, 4 Drawing Sheets

DYNAMIC CALL MANAGEMENT AND DISPLAY

BACKGROUND

The present invention relates generally to call management and more specifically to configurable dynamic call management and display.

When making a phone call, a caller may expect the recipient to be alone or in a quiet environment when the recipient picks up the call. A recipient may, however, be unavailable, or in an environment that is too noisy to support a telephone conversation. In addition, the recipient may only have a short time to conduct a phone call, such as during a break from a meeting, and therefore may not be able or willing to take a lengthy telephone call. One or the other party is unaware of these conditions prior to the call being connected. Consider the following example. One spouse calls the other for something urgent while the other spouse is in a meeting. The recipient's phone shows the caller ID to be that of their spouse, however, the recipient is unaware of the urgency of the call. The recipient does not answer the phone because the recipient is in a meeting. The caller could either keep calling until the recipient picks up the phone, or call the office hoping to reach a coworker that can help to locate the spouse.

In an additional example, a meeting attendee may set their telephone to forward all calls to a teleconference number. The call forwarding will forward all calls to the conference number, including any personal calls. This may result in lost meeting time, and can also result in an embarrassing situation if a personal call is connected to the meeting.

SUMMARY

An embodiment includes a system, which includes one or more call systems and a computer processor communicatively coupled with the one or more call systems. The computer processor is configured to receive a communication from a first call system of the one or more call systems. The computer processor is further configured to retrieve recipient data from a second call system of the one or more call systems. The recipient data includes one or more receiver conditions. The computer is additionally configured to determine if the one or more receiver conditions have been met, and if they have been met, the computer processor forwards the communication to the second call system.

Another embodiment is a method of dynamic call management and display. The method includes receiving, at a computer, a communication from a caller. The method further includes retrieving, at the computer, recipient data from a recipient. The recipient data includes one or more receiver conditions. The method further includes determining, at the computer, if the one or more receiver conditions have been met, and if they have been met the method forwards the communication to the recipient.

Additional features and advantages are realized through the techniques of the present embodiment. Other embodiments and aspects are described herein and are considered a part of the claimed invention. For a better understanding of the invention with its advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

An embodiment provides a dynamic caller display, which shows not just the caller's name but also a condition the caller expects the recipient to meet. In an embodiment, the recipient can be notified of the expectations of the caller prior to receiving the call. In an embodiment, the caller ID on the recipient's telephone shows a dynamic message such as, for example, "Spouse Urgent Private" that indicates that the calling spouse is calling regarding something urgent and expects privacy for the call. In an embodiment, when the recipient spouse sees this information on their caller ID display on the telephone, the recipient spouse knows to pick up the phone right away and to find a location to speak privately.

In an embodiment, when the recipient receives the call, the caller will be automatically notified of the recipient's condition. In an additional embodiment, the caller is notified of the recipient's condition prior to the recipient receiving the call. If the caller is satisfied with the recipient's condition, the call is placed; otherwise, the call is terminated.

In another embodiment, a condition checker module checks the condition of the caller and the condition of the recipient and automatically determines if the call will be placed or not. In an embodiment, if the condition check module determines that the call will not be placed, the condition checker module will continue to monitor the conditions of both the recipient and the caller until both conditions match and will then place the call.

In yet another embodiment, the caller display shown on the recipient's telephone is a secret code that is understood by the recipient. In an embodiment, a caller display manager module enables the recipient to pre-map a list of secret codes to a particular caller. In an embodiment, the recipient can pre-map the caller's identity to a list of secret code such as "Pizza Order," "Pickup Ready," "Deli Order," etc. In an embodiment, the caller's identity can be randomly mapped to one of the secret codes set by the recipient.

Figure 1:
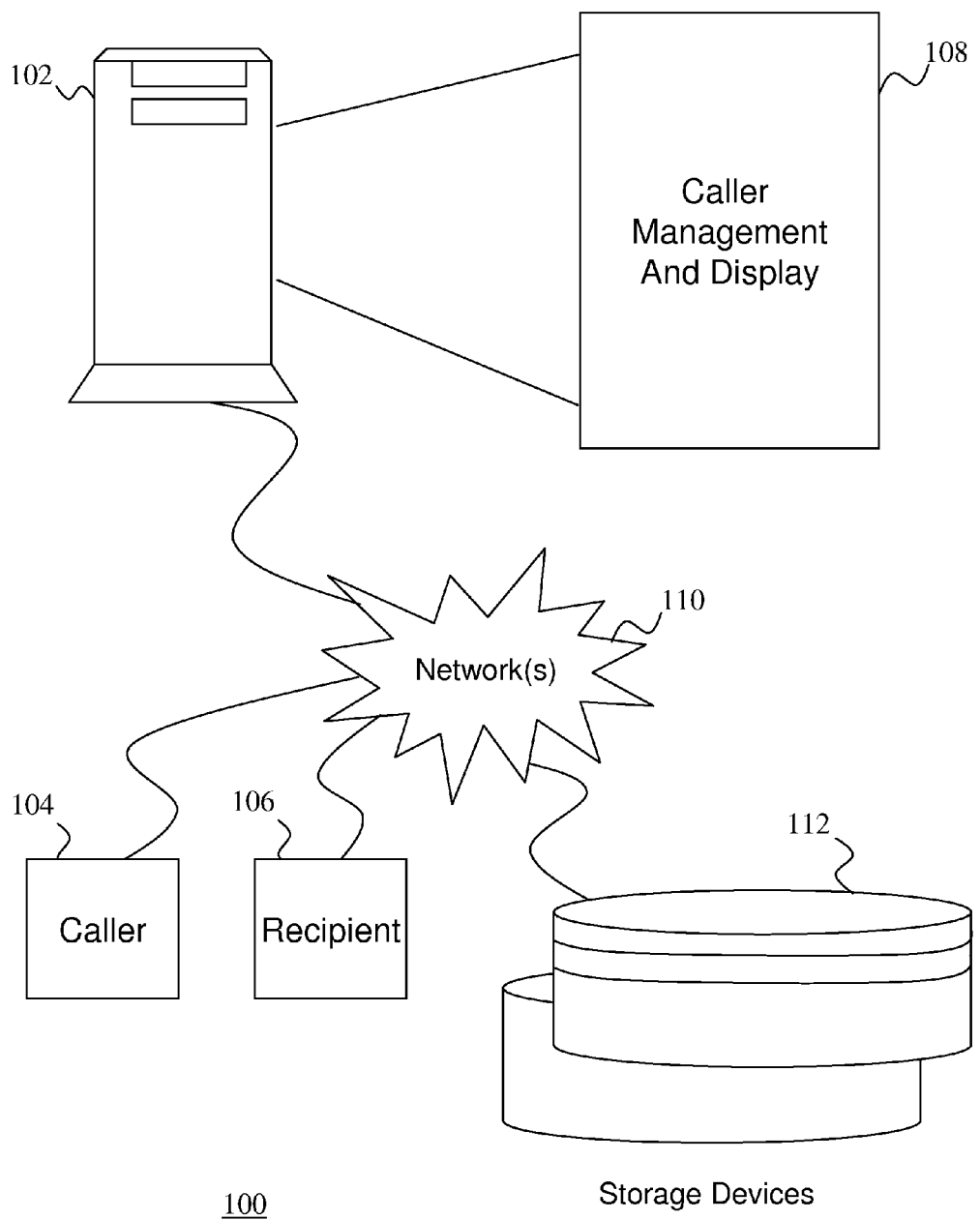
FIG. 1 illustrates a block diagram of a system for dynamic call management and display in an embodiment.

Turning now to FIG. 1, a system 100 for implementing dynamic call management and display will now be described. In an embodiment, the system 100 includes one or more host system computers 102 executing computer instructions for dynamic call management and display. The one or more host system computers 102 may operate in any type of environment that is capable of executing a software application. One or more host system computers 102 may comprise a high-speed computer processing device, such as a mainframe computer, to manage the volume of operations governed by an entity for which a dynamic call management and display 108 process is executing. In an embodiment, the one or more host system computers 102 are part of an enterprise (e.g., a commercial business) that implements the dynamic call management and display 108.

In an embodiment, the system 100 depicted in FIG. 1 includes one or more caller systems 104 and recipient systems 106 through which users at one or more geographic locations may contact the one or more host system computers 102. The caller systems 104 are coupled to the one or more host system computers 102 via one or more networks 110. In an embodiment, the caller systems 104 communicate with the recipient systems 106 over the one or more networks 110. Each of the caller systems 104 and the recipient systems 106, collectively call systems, may be implemented using a general-purpose computer executing a computer program for carrying out the processes described herein. In an embodiment, the caller systems 104 and the recipient systems 106 are telephone handsets including one or more of a standard telephone, a cellular telephone, a smart phone, a voice over IP (VOIP) telephone, or any such communication device as is known in the art. In an embodiment, the caller systems 104 and/or the recipient systems 106 are GPS enabled and generate GPS information including coordinates and speed. In another embodiment, the caller systems 104 and/or recipient systems 106 include one or more accelerometers for detecting movement and acceleration. The caller systems 104 and the recipient systems 106 may be personal computers (e.g., a laptop, a personal digital assistant, a mobile device) or host attached terminals. It will be understood that in an embodiment, the caller systems 104 and the recipient systems 106 may be heterogeneous systems. By way of non-limiting example, a caller system 104 may be a computer operating over a VOIP system, and the recipient may be a standard telephone system. In an embodiment, the caller system 104 and recipient system 106 are homogeneous systems such as cellular telephones, or any other telephonic device as is known in the art.

The networks 110 may be any type of known network including, but not limited to, a wide area network (WAN), a local area network (LAN), a global network (e.g., the Internet), a virtual private network (VPN), an intranet and a telephone network. The networks 110 may be implemented using a wireless network or any kind of physical network implementation known in the art. The caller systems 104 and the recipient systems 106 may be coupled to the one or more host system computers 102 through multiple networks (e.g., intranet and Internet) so that not all caller systems 104 are coupled to the one or more host system computers 102 through the same network. One or more of the caller systems 104, one or more recipient systems 106, and the one or more host system computers 102 may be connected to the networks 110 in a wireless fashion. In one embodiment, the networks 110 include an intranet and one or more caller systems 104 and recipient systems 106 executing an application (e.g., a web browser) to contact the one or more host system computers 102 through the networks 110.

In an embodiment, the storage device 112 includes a data repository with data relating to the dynamic call management and display 108 by the system 100, as well as other data/information desired by the entity representing the one or more host system computers 102 of FIG. 1A. The storage device 112 is logically addressable as a consolidated data source across a distributed environment that includes networks 110. Information stored in the storage device 112 may be retrieved and manipulated via the one or more host system computers 102, the caller systems 104, and/or the recipient systems 106. In an embodiment, the storage device 112 includes one or more databases containing, e.g., dynamic call management and display data, and corresponding configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 110), or from a data stream from another server located on one of the one or more networks 110. In addition, all or a portion of the storage device 112 may alternatively be located on one of the caller systems 104, and or the recipient systems 106.

The one or more host system computers 102 depicted in the system of FIG. 1 may be implemented using one or more servers operating in response to a computer program stored in a storage medium accessible by the server. The one or more host system computers 102 may operate as a network server (e.g., a web server) to communicate with the caller systems 104 and the recipient systems 106. The one or more host system computers 102 handle sending and receiving information to and from the caller systems 104 and the recipient systems 106 and can perform associated tasks. The one or more host system computers 102 may also include a firewall to prevent unauthorized access to the one or more host system computers 102 and enforce any limitations on authorized access. For instance, an administrator may have access to the entire system and have authority to modify portions of the system. A firewall may be implemented using conventional hardware and/or software as is known in the art.

The one or more host system computers 102 may also operate as an application server. The one or more host system computers 102 execute one or more computer programs to provide dynamic call management and display 108. In an alternate embodiment, the caller systems 104 and/or recipient systems 106 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

It will be understood that the execution of the call management and display processes and methods described in FIG. 1 may be implemented as modules in hardware, software executing on hardware, or a combination thereof.

Figure 2:
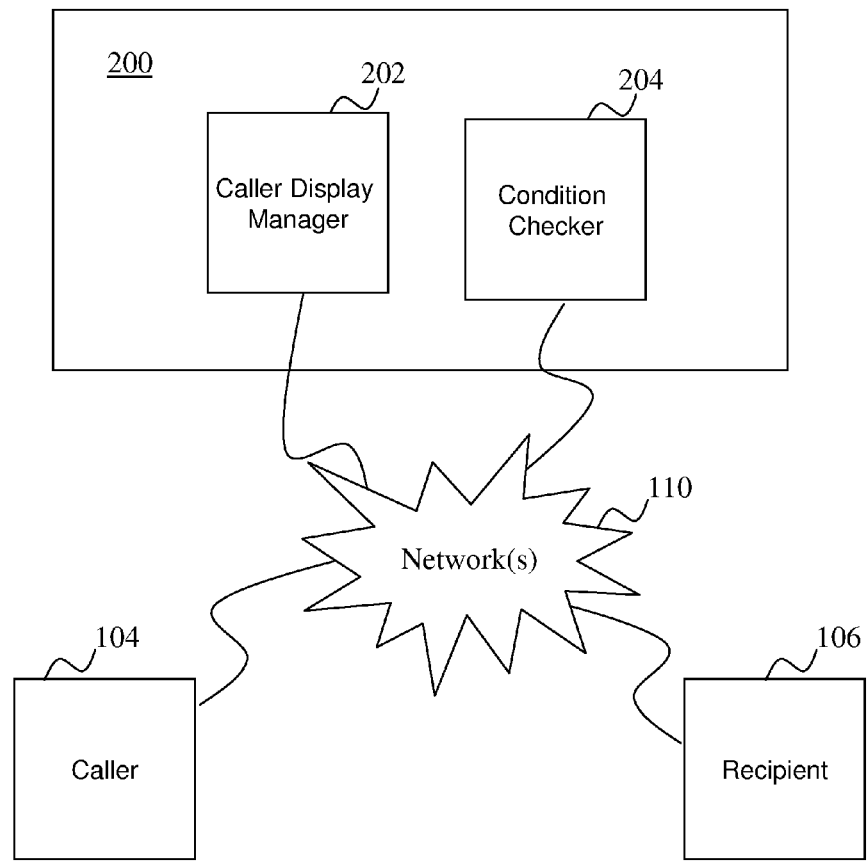
FIG. 2 illustrates a block diagram of a system and network for dynamic call management in accordance with an embodiment.

FIG. 2 illustrates a block diagram of a call manager 200 in accordance with an embodiment. The call manager 200 is executed by the caller management and display 108. In an additional embodiment, the call manager 200 is executed on the host system 102 directly. The call manager 200 includes a caller display manager module 202. In an embodiment, the caller display manager module 202 executes within the dynamic call management and display 108 of FIG. 1. The caller display manager module 202 manages information that is displayed on a caller system 104 and/or a recipient system 106. In an embodiment, the caller display manager module 202 includes a condition checker module 204. In an embodiment, the condition checker module 204 executes within the dynamic call management and display 108 of FIG. 1. The condition checker module 204 manages a call between the caller system 104 and the recipient system 106. The condition checker module 204 matches call conditions set at the caller system 104 with call conditions set at the recipient system 106, and, if the conditions match, the condition checker module 204 will connect the call from the caller system 104 to the recipient system 106. In an embodiment, if the conditions do not match the condition checker module 204 presents the caller system 104 with options to either terminate the call, connect the call at a future time, or other options as will be described in more detail below. In an embodiment, the condition checker module 204 terminates the call if the conditions do not match. In an embodiment, the caller display manager module 202 includes both the caller display manager module 202 and the condition checker module 204.

In an embodiment, a caller system 104 initiates a call to a recipient system 106 through the network 208. The condition checker module 204 receives the call and receives the caller's conditions. The caller's conditions indicate one or more of: the reason for the call, the urgency of the call, the caller's emotional state, the condition that the caller needs the recipient, or the recipient's environment to be in, and any other information that the caller may need to transmit to the recipient. In an embodiment, the condition checker module 204 communicates with the recipient and retrieves the recipient's condition from the recipient system 106. In an alternate embodiment, the recipient sets their condition in the call manager 200 prior to the caller initiating the call, and the condition checker module 204 receives the recipient's condition from, for example, the storage device 112 of the call manager 200. In an additional embodiment, the condition checker module 204 determines the recipient's condition automatically. In an embodiment, the condition checker module 204 may determine that the recipient is driving by accessing GPS and/or accelerometer information provided by the recipient system 106. If the GPS information indicates that the recipient is moving at a high rate of speed, the condition checker module 204 will deduce that the recipient is driving and will process the call according to how it has been configured. In an embodiment, the condition checker module 204 is configured to notify the caller that the recipient cannot currently take the call and may terminate the call. The condition checker module 204 compares the condition requirements of the caller and the recipient, and manages the call accordingly as will be discussed in more detail below.

In an embodiment, the caller display manager module 202 receives the caller's conditions, and, based on the recipient's settings, displays the caller's condition information on the recipient system 106. In an embodiment, the caller's condition is displayed on the caller ID display of the recipient's phone. In an additional embodiment, the caller's condition is displayed on a screen on the recipient system 106. In an embodiment, the caller's condition information is transmitted to the recipient when the call is connected to the recipient system 106. In an additional embodiment, the caller's condition is sent to the recipient system 106 and the recipient is given the option to allow the call to be connected, or to deny the call. If the call is denied, the recipient system 106 may transmit a message to the calling system.

The illustration of FIG. 2 is a simplified representation of the various components of the call manager 200 for purposes of clarity. It will be understood by those of ordinary skill in the art that additional or fewer components may be used in alternate embodiments. In additional embodiments, the layout and configuration of the components may differ from those of FIG. 2 without affecting the functionality of the call manager 200. In additional embodiment, the various components may be located in separate modules. In further embodiments, the functionality of various components may be incorporated into a single hardware or software module.

Figure 3:
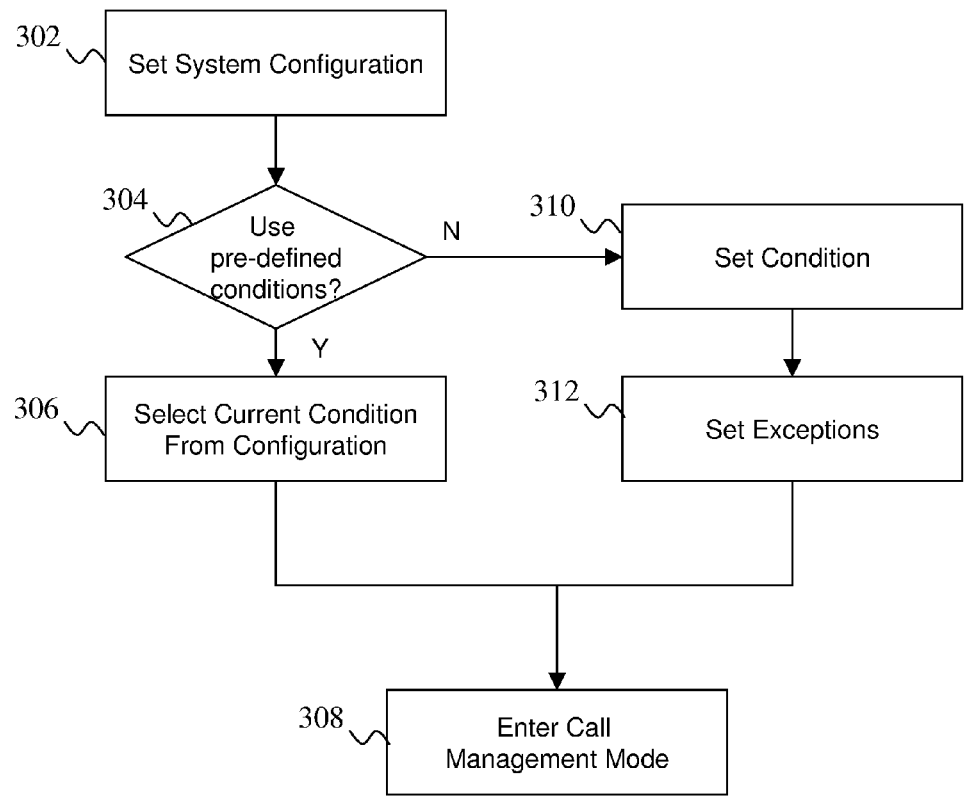
FIG. 3 illustrates a process flow for configuring a call manager in an embodiment.

FIG. 3 illustrates a process flow for configuring a call manager 200 in an embodiment. In an embodiment the process flow of FIG. 3 is executed on the call manager 200 of FIG. 2. At block 302 a user (recipient or caller) initializes the system configuration. In an embodiment, the user initializes the system configuration from a telephone. In additional embodiment, the recipient initializes the system configuration at a computer connected to the call manager 200 of FIG. 2. At block 304 the user either selects a predefined condition or creates a new set of conditions. In an embodiment, the recipient establishes a plurality of condition settings that the user can choose from when the user sets their condition. Where the user is a caller, the user sets conditions for their call to be received. Where the user is a recipient, the user sets conditions for receiving any incoming calls. If the user chooses to select a predefined condition, at block 306, the user selects the current condition from the predefined conditions. In an embodiment, the user is provided a list of predefined conditions from the call manager 200 of FIG. 2. In an embodiment, the user listens to a list of predefined conditions over a telephone call connected to the call manager 200. In an embodiment, the call manager 200 "reads" a list of predefined conditions either by a prerecorded voice, or by using a computer generated voice as is known in the art. In an embodiment, the recipient selects the predefined condition interactively using touch-tones on the telephone. In yet another embodiment, the call manager 200 is configured to execute voice recognition technology and recipient selects predefined conditions by speaking them into the telephone. In yet another embodiment the user connects to the call manager 200 over a computer network via, for example, a web browser or an application executing on the computer or a smart phone and selects a predefined condition. Once the user selects the predefined condition, at block 308 the call manager 200 enters call management mode, and any telephone calls placed to the recipient are intercepted by the call manager 200 and processed as described in more detail below.

Returning to block 304, if the user chooses to set a new configuration, processing continues at block 310. At block 310 the user sets one or more conditions. When the user is a caller, the user sets one or more conditions for their call to be received. When the user is a recipient, the user sets one or more conditions for receiving the incoming calls. In an embodiment, the caller can set any condition such as "private call", "long call", "urgent", or "need answer by 3 pm today". In an embodiment, the recipient can set any condition such as, "In a meeting," "Driving," "Out to dinner," "Accepting Urgent Calls Only," or any other condition. It will be understood that these are non-limiting examples provided for clarity only and that in an embodiment, any condition can be set by the recipient or the caller. In an embodiment, the caller associates one or more conditions with a recipient of his call. In an embodiment, the recipient associates one or more conditions with a caller. A recipient may, for example, set a condition of "In a meeting" for a particular caller, or set of callers, and set a condition of "Accepting urgent calls only" for all other callers. A caller can place calls of the same nature to particular recipients. For example, a husband calls his wife at 4 pm on daily basis to ask her what's for dinner, or a woman calls her boyfriend regularly asking where he is. Both callers and recipients can set secret codes to call conditions. In an embodiment, the caller sets their notes and maps one or more secret codes to one or more of their notes. For example, a caller may map their note, such as, "I'm looking for you, tell me where you are", to a secret code "location?" or, a number code, or an emoticon, or other symbol as is known in art. The caller selects the secret code to be sent to his recipient. The caller display manager module 202 of FIG. 2 converts the secret code to the mapped caller note before the call is sent. In an embodiment, the recipient sets caller notes and maps one or more secret codes to one or more caller notes, and further maps the one or more secret codes to one or more callers. For example, a recipient may map a caller note, such as, "I'm looking for you, tell me where you are." to a secret code such as "look?" or, a numeric code, or an emoticon, or other symbol as is known in the art. In an embodiment the recipient maps the secret code to a caller. When the caller mapped to the secret code calls, the caller's note, such as "I'm looking for you, tell me where you are.", is handled by the caller display manager module 202 of FIG. 2 prior to delivery of the call to the recipient. In an additional embodiment, the caller display manager module 202 of FIG. 2 converts the caller's message back to the recipient's secret code and sends the secret code, in this case "look?" to the recipient's telephone. The recipient can review the secret code and react to the code accordingly. In an embodiment, if the caller note is not mapped to a secret code, the caller display manager module 202 sends the text of the caller note to the recipient. It will be understood that in embodiments the caller notes, and secret codes can include any text or symbols and that the examples provided are for purposes of clarity.

At block 310 of FIG. 3, once the one or more conditions are set, one or more exceptions can be set. In an embodiment, the caller sets exceptions including one or more recipients are allowed to override the conditions. In an embodiment, the caller does not set any exceptions. In an embodiment, the recipient sets exceptions including one or more callers that are allowed to override the conditions. In an embodiment, the recipient sets an exception to send all calls from one or more callers directly to voice mail regardless of the recipient's current condition. In an additional embodiment, the recipient sets an exception to indicate that one or more callers are not allowed to make calls to the recipient. In an embodiment, the recipient does not set any exceptions and the set conditions will apply to all callers. It will be understood that in embodiments the exceptions can include any type of exception including without limitations, providing a message to the caller, disconnecting the call, forwarding the call to another line, or any other exception action.

Once the exceptions are set, at block 308, the call manager 200 enters call management mode, and any telephones call placed to the recipient are received by the call manager 200 and processed as described in more detail below.

In an embodiment, the call manager 200 is configured to automatically determine conditions without input from the recipient. In an embodiment, the call manager 200 determines an activity of the recipient, such as that the recipient is driving, by accessing sensors such as GPS and/or accelerometer data from the recipient's system and sets conditions accordingly. In an alternate embodiment the call manager 200 retrieves calendar information from the recipient's telephone or computer system and sets conditions based on the recipient's availability. In a further embodiment, the call manager 200 uses the recipient's GPS information to determine the recipient's condition based on the recipient's geographic location. For example, if the recipient's GPS information indicates that the recipient is in the office, the call manager 200 sets conditions indicating that the recipient is working.

Figure 4:
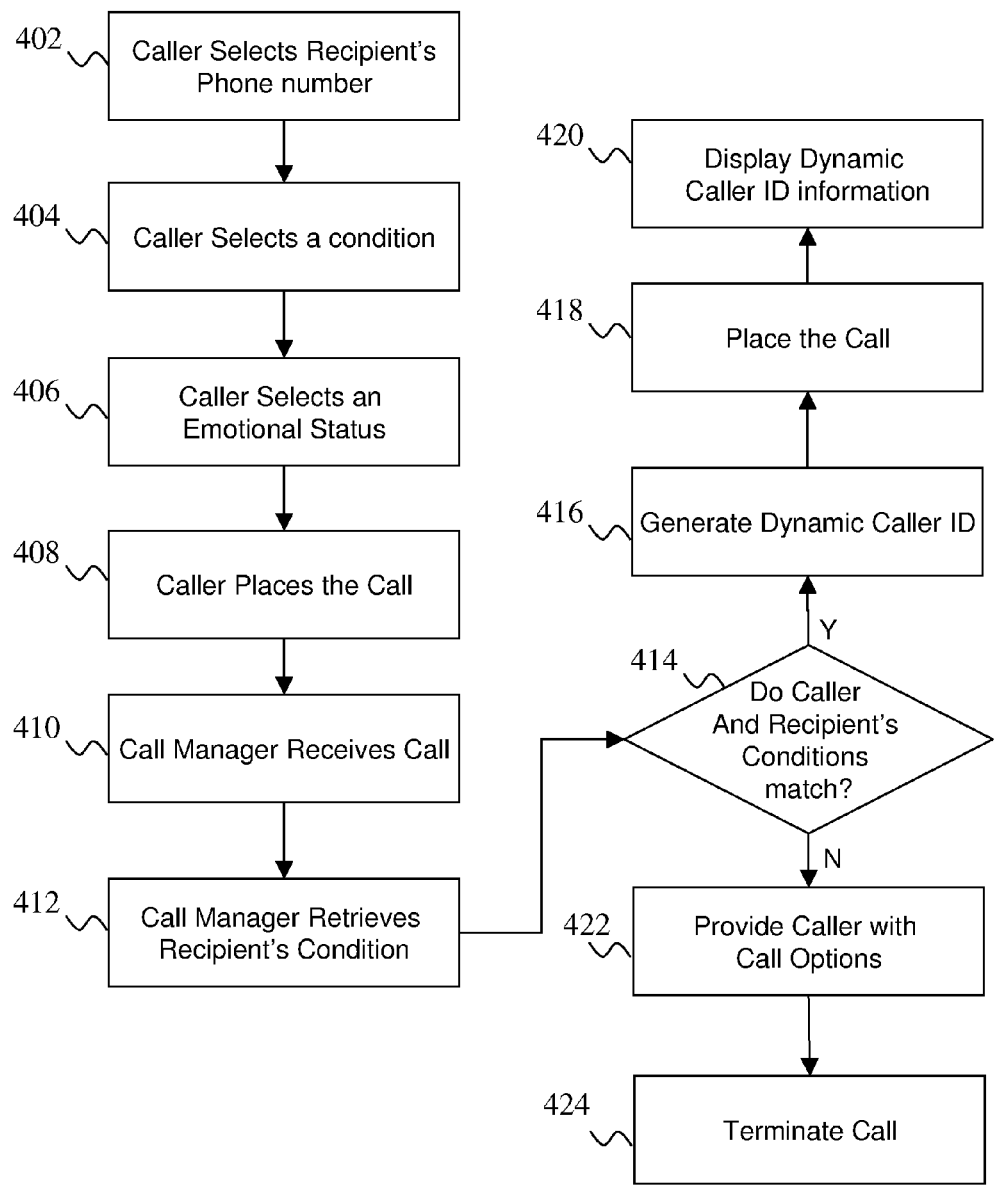
FIG. 4 illustrates a process flow for processing a call using the call manager in an embodiment.

FIG. 4 illustrates a process flow for processing a call using the call manager 200 in an embodiment. In an embodiment, the process flow of FIG. 4 is executed on the call manager 200 of FIG. 2. At block 402 a caller selects a caller's phone number. In an embodiment the caller selects the recipient's phone number from a phone book application. In an alternate embodiment the caller dials the caller's number directly. In yet another embodiment the caller initiates communication with the recipient from a computer application. At block 404 the caller sets a caller condition as described in FIG. 3. In an embodiment, the caller condition includes one or more of the time window in which the caller would like to make the call, the caller's availability, the urgency of the call, one or more messages that the caller would like to make sure the recipient receives, or any other information that the caller would like to provide to the recipient.

At block 406, the caller may set the caller's emotional state. In an embodiment the caller selects the emotional state from a list of states including angry, worried, happy, excited, etc. In an additional embodiment, the caller chooses not to set an emotional status. At block 408 the caller places the call. In an embodiment, the caller places the call automatically after setting one or both of the caller's condition and the caller's emotional status. In an additional embodiment, the caller is already connected to the call manager 200 and at block 408, the caller is chooses to complete the call to the recipient. At block 410 the call manager 200 receives the call and the associated caller conditions and/or emotional state. At block 412 the call manager 200 retrieves the recipient's condition. In an embodiment, the call manager 200 retrieves the one or more conditions set by the recipient from the storage device 112. In an additional embodiment, the call manager 200 retrieves the recipient's state from the recipient's telephone. In yet another embodiment, the call manager 200 retrieves the recipient's condition from the recipient's calendar application. At block 414, the call manager 200 determines if the recipient and the caller's conditions match. In an embodiment the call manager 200 retrieves all available information including the recipient's condition, telephone status, GPS and movement information, and calendar information and is configured to use all of the data to determine if the recipient will receive the call using one or more pieces of the available information. In yet another embodiment, the call manager 200 poles the recipient and the recipient interactively sets the recipient's condition. In an embodiment, the call manager 200 determines that the recipient will only accept urgent calls and allows the call to go through if the caller indicates that the call is urgent. It will be understood that these embodiments are lists for purposes of clarity and that in other embodiments the call manager 200 may match any of the caller's conditions with the one or more of the recipient's conditions before allowing the call to complete.

If the caller's and the recipient's conditions match, the caller display manager module 202 of FIG. 2 generates a dynamic caller ID data. In an embodiment, the caller display manager module 202 uses the caller's conditions and emotional state to generate the dynamic caller ID data. At block 418 the call manager 200 places the call that includes the dynamic caller ID data to the recipient. At block 420, the dynamic caller ID data is displayed on the recipient's device and the recipient receives the call.

Returning to block 414, if the caller and recipient conditions do not match, the caller is provided with one or more options. In an embodiment the options include, hold for an amount of time, a call back option which provides the caller with a time when the recipients condition will match the caller's conditions, a connect me option which allows the call manager 200 to call the caller when the recipient is available, an option to disconnect the call, and/or the call manager 200 may provide the caller with a message based on the recipient's condition settings, or a message provided by the recipient in real time. In an embodiment, the caller may provide a call back window to the call manger indicating the acceptable time that the caller will be available. At block 424, based on the caller's selection, the call manager 200 terminates the call.

Technical effects and benefits include a mechanism for providing dynamic caller conditions to a recipient before the recipient answers the call. An additional benefit is the ability to create conditions at a per caller level that will automatically allow a caller to be connected or to prevent a caller from being connected to the recipient. Yet another benefit is the automatic setting of recipient conditions based on the recipient's current status based on GPS data, and/or calendar information.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof, A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A system, comprising:
a call manager computer in communication with one or more call systems, the call manager computer configured to perform:
receiving a communication from a first call system of the one or more call systems, the communication comprising caller conditions;
retrieving recipient data from a second call system of the one or more call systems, the recipient data comprising receiver conditions;
determining if the caller conditions and the receiver conditions have been met;
generating dynamic caller identification (ID) data, the dynamic caller ID comprising a caller name and a caller condition;
forwarding the communication to the second call system responsive to determining that the receiver conditions have been met; and
preventing communication to the second call system responsive to the receiver conditions not being met;
wherein the caller conditions comprise:
a reason for the communication;
an urgency level of the communication;
a caller's emotional state;
a condition that the caller needs of a recipient of the communication;
an environment in which the recipient of the communication must be in; and
wherein forwarding the communication is further responsive to determining that the caller conditions have been met.

2. The system of claim 1, wherein the preventing communication to the second call system further comprises:
terminating the communication; and
returning one or more options to the first call system.

3. The system of claim 1, wherein the forwarding of the communication further comprises sending the dynamic caller ID data to the second call system for display of the dynamic caller ID data on the second call system.

4. The system of claim 3, wherein the dynamic caller ID data comprises a secret code, the secret code comprising at least one of a text, numeric code, emoticon, or symbol that maps to a caller condition or caller note.

5. The system of claim 4, wherein the secret code is configured by a recipient of the communication prior to receiving the communication by the call manager computer.

6. The system of claim 4, wherein the secret code is configured by the caller prior to receiving of the communication by the call manager computer.

7. The system of claim 1, wherein the one or more receiver conditions are determined using one of:
a calendar associated with the second call system;
a location of the second call system;
interactive input by a user of the second call system using a touch tone system; and
an activity of the user of the second call system based on one or more sensors in the second call system.

8. The system of claim 1, wherein the receiver conditions are associated with one or more callers.

9. A method of dynamic call management and display, the method comprising:
receiving, at a computer, a communication from a caller, the communication comprising caller conditions;
retrieving, at the computer, recipient data from a recipient, the recipient data comprising receiver conditions;
determining, at the computer, if the caller conditions and the receiver conditions have been met;
generating dynamic caller identification (ID) data, the dynamic caller ID comprising a caller name and a caller condition;
forwarding the communication to the recipient responsive to determining that the receiver conditions have been met; and
preventing communication to the second call system responsive to the receiver conditions not being met;
wherein the caller conditions comprise:
a reason for the communication;
an urgency level of the communication;
a caller's emotional state;
a condition that the caller needs of the recipient;
an environment in which the recipient must be in; and
wherein forwarding the communication is further responsive to determining that the caller conditions have been met.

10. The method of claim 9, wherein the preventing communication to the second call system further comprises:
terminating the communication; and
returning one or more options to the caller.

11. The method of claim 9, wherein the forwarding of the communication further comprises sending the dynamic caller ID data to the recipient.

12. The method of claim 11, wherein the dynamic caller ID data comprises a secret code, the secret code comprising at least one of a text, numeric code, emoticon, or symbol that maps to a caller condition or caller note.

13. The method of claim 12, wherein the secret code is configured by the recipient prior to receiving the communication at the computer.

14. The method of claim 12, wherein the secret code is configured by the caller prior to the receiving of the communication at the computer.

15. The method of claim 9, wherein the one or more receiver conditions are determined using one of:
a calendar associated with the recipient;
a location of the recipient;
interactive input by using a touch tone system; and
an activity of the recipient based on one or more sensors associated with the recipient.

16. The method of claim 9, wherein the receiver conditions are associated with one or more callers.

17. A non-transitory computer program product for dynamic call management and display, the computer program product comprising:
a tangible computer readable storage medium having computer readable program code embodied therewith, the computer readable program code for execution by a processor to perform a method, the method comprising:
receiving a communication from a caller, the communication comprising caller conditions;
retrieving recipient data from a recipient, the recipient data comprising receiver conditions;
determining if the caller conditions and the receiver conditions have been met;
generating dynamic caller identification (ID) data, the dynamic caller ID comprising a caller name and a caller condition;

forwarding the communication to the recipient responsive to determining that the receiver conditions have been met; and preventing communication to the second call system responsive to the receiver conditions not being met;

wherein the caller conditions comprise:

a reason for the communication;

an urgency level of the communication;

a caller's emotional state;

a condition that the caller needs of the recipient; and an environment in which the recipient must be in; and wherein forwarding the communication is further responsive to determining that the caller conditions have been met.

18. The computer program product of claim 17, wherein the preventing communication to the second call system further comprises:

terminating the communication; and returning one or more options to the caller.

19. The computer program product of claim 17, wherein the forwarding of the communication further comprises sending the dynamic caller ID data to the recipient.

20. The computer program product of claim 19, wherein the dynamic caller ID data comprises a secret code, the secret code comprising at least one of a text, numeric code, emoticon, or symbol that maps to a caller condition or caller note.

21. The computer program product of claim 20, wherein the secret code is configured by the recipient prior to the receiving.

22. The computer program product of claim 20, wherein the secret code is configured by the caller prior to the receiving.

\* \* \* \* \*